UNITED STATES PATENT OFFICE.

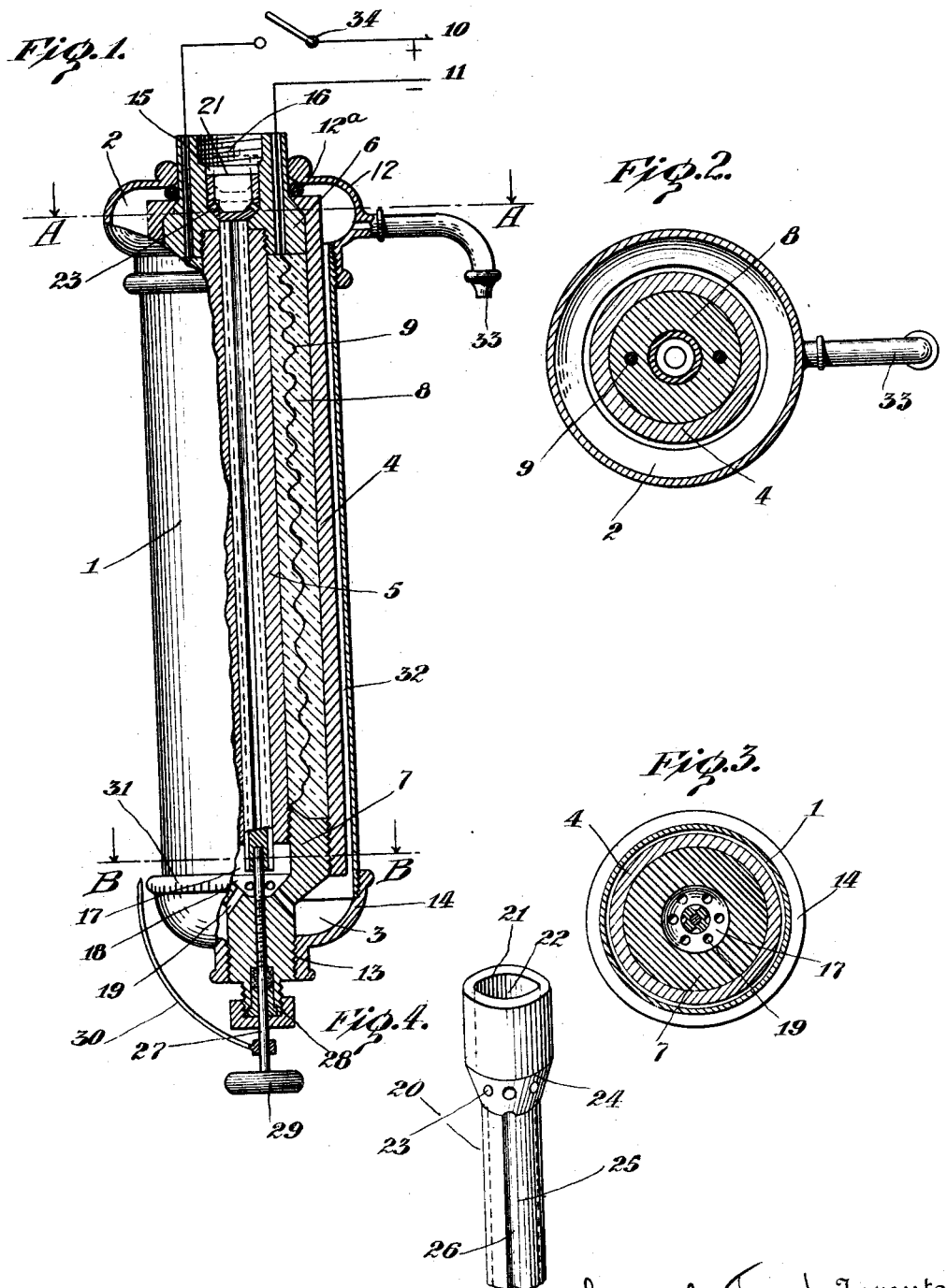

SAMUEL TROOD, OF NEW YORK, N. Y., ASSIGNOR TO WESTINGHOUSE ELECTRIC & MANUFACTURING COMPANY, A CORPORATION OF PENNSYLVANIA.

ELECTRIC WATER-HEATER.

1,186,710.   Specification of Letters Patent.   Patented June 13, 1916.

Application filed March 18, 1912. Serial No. 684,588.

*To all whom it may concern:*

Be it known that I, SAMUEL TROOD, a citizen of the United States, and resident of New York, in the county of New York and State of New York, have invented certain new and useful Improvements in Electric Water-Heaters, of which the following is a specification.

Many attempts have been made to provide devices in which a liquid, while running from a faucet, may be heated by means of an electric current, passing through high resistance wire embedded in insulating material, but, in all such devices, separate mechanical means were required for starting the flow of the liquid and for regulating the temperature of the same.

The present invention has for its object to provide a thermostatically controlled device in which heat is produced by means of an electric current, passing through a conductor of high resistance, embedded in insulating material, whereby the heat so produced, first, affects a member, made of material adapted to be expanded by heat, so that a valve is opened to allow a free flow of the liquid into the device, and second, heats the liquid therein until drawn off through a suitable faucet.

Another object of the invention is to provide means whereby the temperature of the liquid may be predetermined and no liquid will flow from the device until this temperature is reached.

An additional object is to provide means whereby the flow of liquid will be interrupted automatically as soon as the supply of electric current ceases.

In a general way the purposes of this invention are effected by placing in a suitable casing a structure, comprising an outer and an inner cylinder, preferably made of iron, the inter-space of which is filled with insulating material, in which is embedded a high resistance conductor connected to a suitable supply of electric energy. A passage or duct is provided between the outer cylinder and the casing, from which liquid may be drawn off by a faucet. The center space or duct of the inner cylinder contains a valve body, made of material, having a high coefficient of linear expansion, such as zinc or an alloy of zinc and tin. The head of this valve body is seated in a recess, connected by a screw thread to a pipe supplying the liquid. This head of the body is furthermore provided with a chamber, having a plurality of apertures leading eventually to channels or grooves in the cylindrical portion of the body. A screw, connected with the expansible body, permits of adjusting the same axially, so that, at a predetermined degree of expansion only, the head will be unseated and liquid may flow from its supply through the grooves into the lower chamber, and then into the outer duct and will be heated to a predetermined degree within the device and drawn off at the faucet.

An indicator hand and an indicating scale permit of correctly adjusting the desired displacement of the valve body, when expanded by heat, and so determine the flow as to draw off liquid of a predetermined degree of heat. The opening of a suitable switch in the electric circuit, interrupts the flow of the current and, in cooling off, the valve body becomes seated again and interrupts the flow of liquid.

It will be seen that the main element in reaching a desired temperature of the liquid, is its time of contact with the heating members, controlled by its speed of flow.

The invention is illustrated, in a simple form, in the drawings, in which,

Figure 1 is an elevation and, in part, a vertical section of the device, Fig. 2, is a horizontal cross-section on the line A—A of Fig. 1, Fig. 3, is a similar cross-section on the line B—B of Fig. 1, and Fig. 4, is a perspective view of a detail of construction.

The device, as illustrated, comprises a casing 1, preferably made of metal, such as brass or nickle, having an upper chamber 2 and a lower chamber 3. The casing contains a heating body, comprising an outer metal cylinder 4, and an inner metal cylinder 5, the upper ends of which are joined by a connecting block 6, and the lower ends by a similar block 7, provided with suitable male and female screw threads for securing the cylinders thereon. The cylindrical space between the cylinders 4 and 5 is filled with insulating material 8, preferably cement, in which is embedded a sufficient length of resistance conductor 9. The reason for selecting cement for the insulating material, is that its coefficient of expansion is substantially the same as that of the resistance conductor. Rupture of the resistance conductor and the insulating material, when expanded by heat, is thus avoided. The resistance conductor is connected to the leading-in wires 10 and 11, which supply electric current from a suitable source.

The upper cap 12 of the outer casing 1, rests upon a rubber gasket 12a in order to provide an efficient water-tight closure and, at the same time, not interfere with the necessary expansion by heat, of any of the parts of the device. The connecting block 7 is also held to the outer casing 1, by means of a screw-thread connection 13 between the block and a lower cap 14.

The upper block 6 is provided with a cylindrical recess or chamber 15 having a frusto-conical lower end to form a valve seat. Female screw threads 16 are provided for connecting the block 6 to a supply pipe for the liquid. The lower block 7 is provided with a cylindrical chamber 17, having a frusto-conical bottom 18 provided with apertures 19 which communicate with the lower chamber 3 of the casing.

The valve member is illustrated in Fig. 4 and comprises a cylindrical rod 20, made of zinc or an alloy of zinc and tin and having an upper cylindrical enlargement or valve body 21 provided with a chamber 22. The valve body 21 is provided with a frusto-conical portion 24 to engage the corresponding valve seat of the chamber 15. A number of apertures 23 lead from the chamber 22 to the chamber 15. The cylindrical portion 25, which closely fits the bore of the inner cylinder 5, is provided with grooves 26 that extend throughout its entire length and communicate with the lower chamber 17, hereinbefore mentioned. A screw 27, is secured to or in loose engagement with the rod 25, having its thread in the lower block 7 and rotating in a suitable packing device 28, so as to prevent any leakage of liquid. A suitable handle 29 is provided for turning the screw, and an indicating finger or pointer 30 is provided to coöperate with a scale 31 in order to indicate the degree of adjustment of the rod 25. Between the casing 1 and the outer cylinder 4, is an intercylindrical space or duct 32 which communicates with the lower chamber 3, as well as the upper chamber 2, to which is also connected the faucet 33. An electrical switch 34 is located in one leg of the electrical conductor leading from the source of current to the heating conductor 9.

When it is desired to draw liquid from the heating device, the indicating finger 30 is set at such position on the index scale 31 as indicates the degree to which the liquid shall be heated. This scale is so graduated with reference to the coöperating parts, that when the indicating finger is set for a given temperature, the expansion of the rod 25 will raise the valve body portion 24 from its seat the necessary degree to insure a flow of water of the proper amount to absorb the desired amount of heat. After adjustment of the screw 27, the switch 34 is closed and the electric current will flow through the resistance conductor 9 and generate heat therein which will be transmitted through the insulating material 8, the outer and inner cylinders 4 and 5 and the valve rod 25. On account of its high coefficient of expansion, the valve rod, being supported at its lower end by the screw 28, will expand upward and raise the valve body portion 24 from its seat. Liquid will then flow from the supply pipe through the apertures 23 into and through the channels 26, in which it becomes heated and from which it passes into the chamber 17 and thence through the apertures 19 into the lower chamber 3 and through the cylindrical duct 32 into the upper chamber 2 from which it may be drawn through the faucet 33. Heat is of course imparted to the liquid when it is in the space 32 as well as when it is in the channels 26. The temperature of the liquid depends upon the dimensions of the space between the valve body and the valve seat, caused by the expansion by heat of the rod 25, the speed of flow of liquid being controlled by this space and the length of time, during which the liquid is in contact with the heating elements. When the switch 34 is opened, the valve closes automatically on account of contraction of the rod 25 caused by the reduction of the temperature to which it is subjected, and the flow of liquid ceases.

It is understood that this device is not limited to the use of an electric heating device for heating the liquid and unseating the controlling valve, since an equivalent result may be secured by the combustion of any suitable fuel.

What the inventor regards as his invention or discovery and desires to secure by Letters Patent of the United States, is—

1. A heater for liquids comprising a liquid supplying means, a casing having a duct or passage normally closed toward the liquid supply, temperature-controlled means for opening the inlet to said duct or passage, and means for heating said temperature-controlled means and said liquid while the liquid passes through said duct.

2. A heater for liquids comprising a liquid supplying means, a casing having a duct or passage, thermostatic means for normally closing said duct toward the liquid supply and for opening the same on an increase in temperature, and means for heating said closing means and said liquid while the liquid passes through said duct.

3. The combination with a casing, of means for supplying liquid thereto, a valve device for normally preventing the flow of liquid into said casing but permitting such flow upon a predetermined increase in temperature, means for applying heat to said valve device and to said liquid while the liquid passes through said casing, and means for regulating the flow of liquid through the casing.

4. The combination with a casing, of means for supplying liquid thereto, a heater adapted to heat the liquid as it passes through said casing, a valve adapted to be operated by variations in temperature for controlling the liquid supply, and means for predetermining the extent of operation of said valve.

5. The combination with a casing, of means for supplying liquid thereto, an electric heater adapted to heat the liquid in said casing, means for controlling the supply of electric current to said heater, a normally closed valve in the path of flow of said liquid, a thermostatic valve-opening means energized by said heater, and means for predetermining the extent to which the valve shall be opened.

In witness whereof the inventor has hereunto set his hand in the presence of two subscribing witnesses, at New York, in the county of New York and State of New York, this 13th day of March, 1912.

SAMUEL TROOD.

In presence of—
RALPH F. SACHERS,
W. EUGENE BLAUVELT.